US005519564A

United States Patent [19]

Carpenter, Jr.

[11] Patent Number: 5,519,564

[45] Date of Patent: May 21, 1996

[54] PARALLEL MOV SURGE ARRESTER

[75] Inventor: Roy B. Carpenter, Jr., Boulder, Colo.

[73] Assignee: Lightning Eliminators, Boulder, Colo.

[21] Appl. No.: 272,010

[22] Filed: Jul. 8, 1994

[51] Int. Cl.$^{6}$ .......................... H02H 9/04

[52] U.S. Cl. .......................... 361/127; 361/56; 338/21

[58] Field of Search .......................... 361/56, 127, 91, 361/111; 338/21

[56] References Cited

U.S. PATENT DOCUMENTS

| | | | |
|---|---|---|---|
| 4,326,232 | 4/1982 | Nishiwaki et al. | 361/127 |
| 4,875,137 | 10/1989 | Rozanski et al. | 361/331 |
| 5,039,452 | 8/1991 | Thompson et al. | 252/518 |
| 5,218,508 | 6/1989 | Doone | 361/127 |
| 5,402,100 | 3/1995 | Urbanek et al. | 361/127 |

FOREIGN PATENT DOCUMENTS

| | | |
|---|---|---|
| 0229464 | 7/1987 | European Pat. Off. . |
| 0230103 | 7/1987 | European Pat. Off. . |
| 9114304 | 9/1991 | WIPO . |
| 932601 | 12/1993 | WIPO . |

*Primary Examiner*—Todd DeBoer
*Attorney, Agent, or Firm*—Rick Martin

[57] ABSTRACT

The invention is a MOV based surge arrester that uses MOVs manufactured from a recently patented process. These new technology MOVs are significantly more uniform in their composition, resulting in more uniform performance. The uniform performance characteristics allow MOVs to be utilized parallel more successfully, eliminating many of the previous problems encountered. Instead of attaching wires to each MOV, the MOVs are packaged by placing them between a pair of contact plates, preferably manufactured from aluminum. The pair of plates are connected together and tensioned using non-conductive nuts and bolts. This packaging significantly increases the surface area between the contact plates and the MOVs. Wiring is minimized. Also, the use of the metal plates increases the ability of a surge suppresser to remove the heat generated in severe over-voltage situations. Additional plates can be utilized to increase surge arrestor surge current capability.

21 Claims, 3 Drawing Sheets

PARALLEL MOV SURGE ARRESTER

CROSS REFERENCE PATENTS

U.S. Pat. No. 5,039,452 to Thompson et al. is incorporated herein by reference.

FIELD OF THE INVENTION

The present invention relates to a surge protector. In particular the present invention discloses an improved surge arrester using ZnO surge arrestor disks.

BACKGROUND OF THE INVENTION

Surge arresters are useful in protecting electronic circuitry from extreme, over-rating transient fault currents. These over-rating transient faults may be caused by switching transients or lightning strikes.

Some surge arresters, especially for higher voltage applications, operate by catastrophic failure of the surge arrester. This is not economically or functionally viable for certain applications, such as power transmission.

One solution to the design of surge arresters is the use of Metal Oxide Varistors ("MOV"). These MOVs along with surge arresters utilizing them are currently manufactured by many manufacturers. However, the Raychem Corporation of California has developed a very high quality MOV that extends its usefulness. The following patents assigned to Raychem are representative of the art.

European Patent No. 0,229,464 to Koch et al. (Pub. Jul. 22, 1987) shows a frangible housing for an electrical component reinforced against explosive shattering by wrapping curable sheet material therearound at spaced apart regions. The wrapped material is cured with ultraviolet radiation. This material holds any pieces shattered by over-voltages together.

European Patent No. 0,230,103 to Koch et al. (Pub. Jul. 29, 1987) discloses a surge arrester where circular varistor blocks are stacked for greater voltage applications.

U.S. Pat. No. 5,039,452 to Thompson et al. (8/91) discloses a process for making ZnO Metal Oxide Varistor (MOV) precursor powder. The powder contains smaller particles of the additive metal oxides evenly distributed throughout the larger particles of the primary metal oxide.

PCT Pat. No. WO 91/14304 (GB 91/00405) to Mikli et al. (Pub. Sep. 19, 1991) discloses a surge arrestor that has eight varesistor blocks stacked together with a fiber-optic cable running through the stack to detect component failure.

PCT Pat. No. WO 93/26017 (US 93/05679) to Wiseman et al. (Pub. Dec. 23, 1993) discloses a method of manufacturing a voltage arrester wherein MOV valve elements are stacked along a longitudinal axis, where the MOV valve elements are compressed between conductive end terminals.

Another solution for surge arresters is the Wagon Wheel™ technology as implemented by LEA Dynatech of Tampa, Fla., and used in the Lightning Eliminators and Consultants, Inc. (LEC) TVSS products. This technology is based on U.S. Pat. No. 4,875,137 to Rozanski et al. (Oct. 1, 1989). The LEC TVSS products utilize low or medium sized, individually fused Metal Oxide Varistor ("MOV") in parallel. This is in direct contrast to violent, catastrophic failures, characteristic of large block, encapsulated or other less efficient protection circuits.

There are several problems with MOV based surge arresters. One problem as illustrated in several of the above patents is that MOVs may explode when handling excessive over-voltages. Compounding this problem is the problem that when MOVs are in parallel, such as with the Wagon Wheel™ technology above, it is possible that the MOVs have different clamping voltage, and thus a larger than expected proportion of the over-voltage or surge current may flow to a single MOV, thusly destroying that part of the parallel circuit. This may cause a chain reaction of similar individual MOV overloads, ultimately destroying the entire parallel circuit. In the case of MOVs stacked in series, such failure will cause the entire surge arrester to fail, instead of just degrade.

Prior technologies use wire based connections to, and between the MOVs to increase the energy handling capability. These wires introduce inductance that slows the reaction time and causes some variation in response time. In addition, these wires make point contact with the MOV face, thus concentrating the surge energy in a very localized area at the wire. This limits the transfer of surge energy between that wire and the MOV; again leading to the major failure mode, burn through at that point, and uneven distribution of the surge energy. This technology will eliminate that risk.

SUMMARY OF THE INVENTION

The main object of this invention is to provide a MOV based surge arrester with improved cooling and reduced risk of component failure.

Another object of the invention is a MOV based surge arrestor with uniform heat distribution and rapid removal of the heat generated by a surge.

Another object of this invention is to provide a MOV based surge arrester that assures uniform distribution of the surge energy through the MOV thus eliminating the risk of failure resulting from the conventional localized contact.

Another object of this invention is to provide a MOV based surge arrester that effectively packages multiple MOVs in parallel and series-parallel that assures them functioning as one.

Other objects of this invention will appear from the following description and appended claims, reference being had to the accompanying drawings forming a part of this specification wherein like reference characters designate corresponding parts in the several views.

The instant invention uses ZnO MOVs manufactured from the advanced manufacturing process disclosed in the '452 patent or from conventional processes with reduced effectiveness. Each surge arrester has a number of these ZnO MOVs in parallel. As these advanced process ZnO MOVs are extremely uniform in their composition and size, the likelihood of an unequal amount of the over-voltage current traveling through any one of the MOVs is significantly reduced. This increases the lifetime of the surge arrester since single MOVs are less likely to fail. This also increases the energy handling capabilities of a surge arrester.

Additionally, the invention packages the MOVs in parallel between two or more contact plates held together and tensioned with non-conductive nuts and bolts. Using these plates, usually aluminum, the contact between the MOVs and the plates is maximized, resulting in significant surge arrester performance improvements.

Before explaining the disclosed embodiment of the present invention in detail, it is to be understood that the invention is not limited in its application to the details of the particular arrangement show, since the invention is capable of other embodiments. Also, the terminology used herein is for the purpose of description and not of limitation.

DETAILED DESCRIPTION OF THE INVENTION

Figure 1:
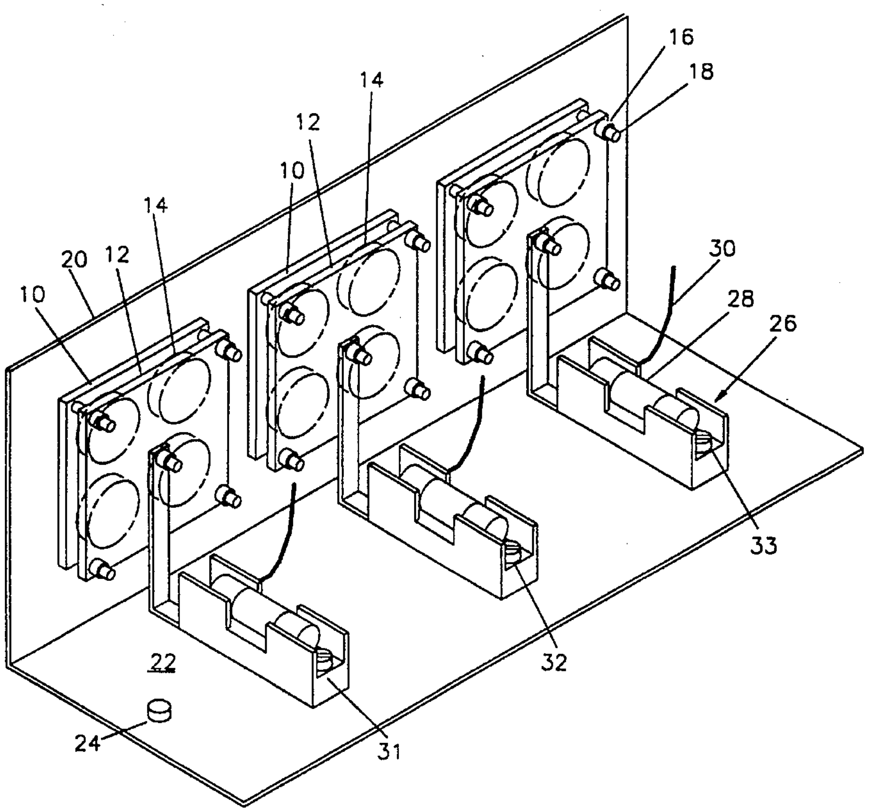
FIG. 1 is a top perspective view of a three phase surge arrester.
Figure 2:
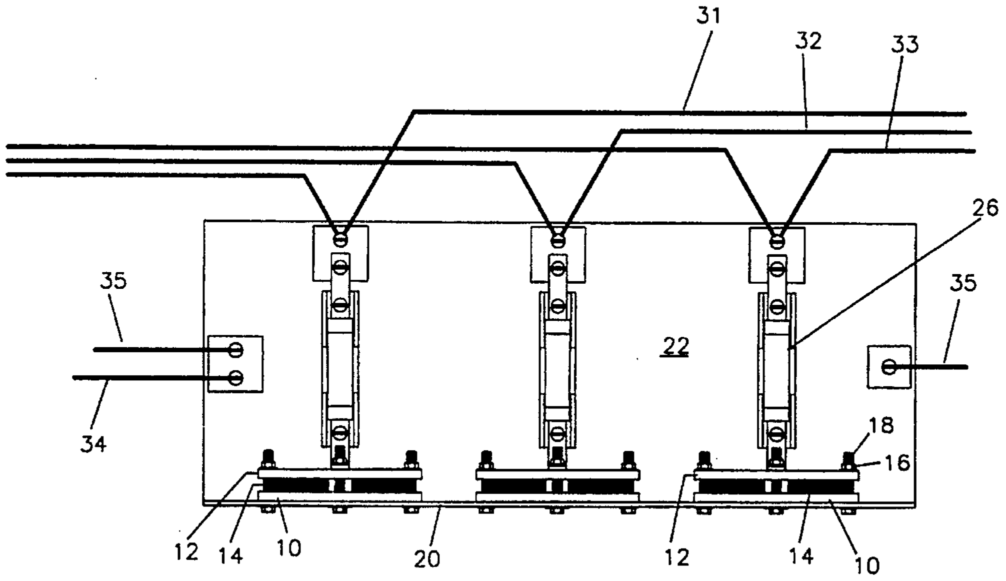
FIG. 2 is a side plan view of the three phase surge arrester shown in FIG. 1.
Figure 3:
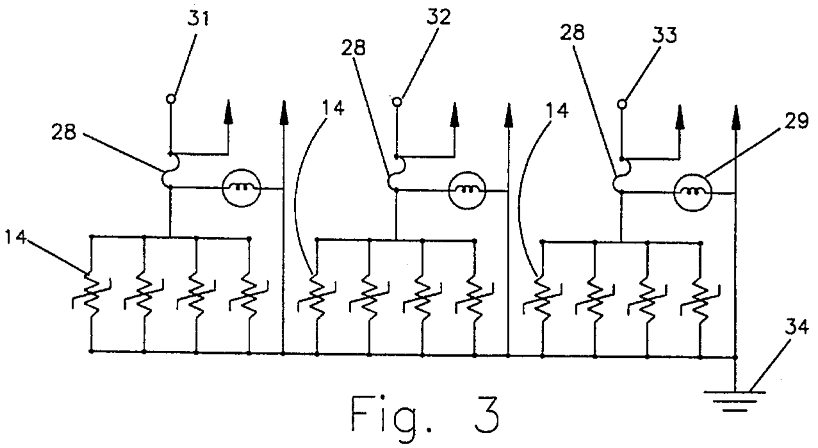
FIG. 3 is a circuit diagram of the three phase arrester shown in FIG. 1.

FIG. 1 is a perspective view of a three phase surge arrester. FIG. 2 is a side view of the same surge arrester. FIG. 3 is a circuit diagram of the same three phase arrester shown in FIG. 1.

Each phase 31, 32, 33 has four ZnO MOVs 14 in parallel sandwiched between a first contact plate 10 and a second contact plate 12. The two contact plates are connected with nylon nuts 16, bolts 18, and optionally washers (not shown). The usage of five nuts 16 and bolts 18 for each phase in the pattern shown allows the first 10 and second 12 contact plates be tensioned with the four MOVs 14 between them to provide protection during severe over-voltage situations. The contact plates 10, 12 in the preferred embodiment are made of aluminum. However, other materials having electrical and heat conductivity are envisioned. Note also that a shared first contact plate 10 may be used since these plates 10 are connected ultimately to a common ground 34. 0r another alternate embodiment would be to eliminate the first contact plate 10 altogether.

The usage of four MOVs 14 in parallel as shown in these figures allows the amount of current that the arrester can handle to increase. Obviously, even more MOVs 14 can be used in parallel using the same packaging concept, providing even higher current protection for a given MOV rating.

The first 10 and second 12 contact plates are stiff. This allows the plates to maintain fairly uniform pressure across the surfaces of the MOVs 14, maximizing the contact surface between the contact plates 10, 12, and the MOVS 14. This in turn minimizes the equivalent load length, providing lower overall contact resistance. This also results in lower clamping voltage levels with much faster response times. The use of plates eliminates the need for wire. This in turn eliminates series impedance. Finally, the use of aluminum to construct the contact plates 10, 12, results in significantly increased heat dissipation. This is important in maintaining performance in severe over-voltage situations.

ZnO MOVs 14 manufactured using the technology disclosed in the '452 patent are preferred. Prior to the introduction of these new technology MOVs, the performance of MOVs could vary by as much as 10%. When wired in parallel, the MOV with the lowest resistance or clamping voltage would receive more than its fair share of current, often resulting in spectacular (explosive) failure of that MOV. Since the dopant was not uniformly distributed throughout the MOV, such a MOV, when failing, would tend to burn through in a single spot. The uniform distribution of dopants in MOVs resulting from the '452 patent technology provides two benefits to the instant invention. First, MOVs in parallel have significantly more equal resistance. Thus, current is going to be more evenly distributed when MOVs are in a true parallel configuration, thus lowering the chance of failures. Secondly, the uniform doping minimizes burn through since there is no longer a "weak spot" in each MOV.

Note that ZnO MOVs 14 constructed with the '452 patent technology can be used with the above described Wagon Wheel™ technology. Such a configuration would not have the advantages disclosed above arising from the use of the aluminum plates. Likewise, the aluminum plates can be used with older technology MOVs. However, though improved, such a surge arrester would not be as effective as one utilizing the newer MOV technology.

Continuing with the discussion of FIGS. 1 to 3, the first aluminum contact plate 10 is attached to an aluminum mounting plate 20. Again, the aluminum helps dissipate heat. Attached in series with each pair of contact plates 10, 12, is a fuse 28 in a fuse block 26. The fuse 28 is a slow blow fuse. The three phase current 31, 32, 33 is connected to the fuse block 26. Attached to each fuse block 26 is a lead 30 to a signaling device. This signaling device may be a light bulb 29 or a LED (not shown). It is used to tell if a specific surge eliminator is healthy. Finally, each fuse block 26 is attached to but electrically isolated from a grounding plate 22, which is connected to the mounting plate 20 and uses a grounding connection 24 to conduct to ground 34. Also present in FIG. 2 is a neutral connection 35.

Figure 4:
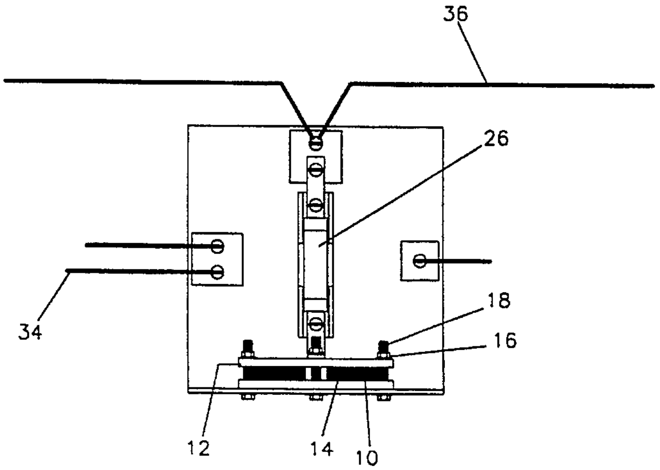
FIG. 4 is a side plan view of a one phase surge arrester useful for a single phase circuits of any voltage.
Figure 5:
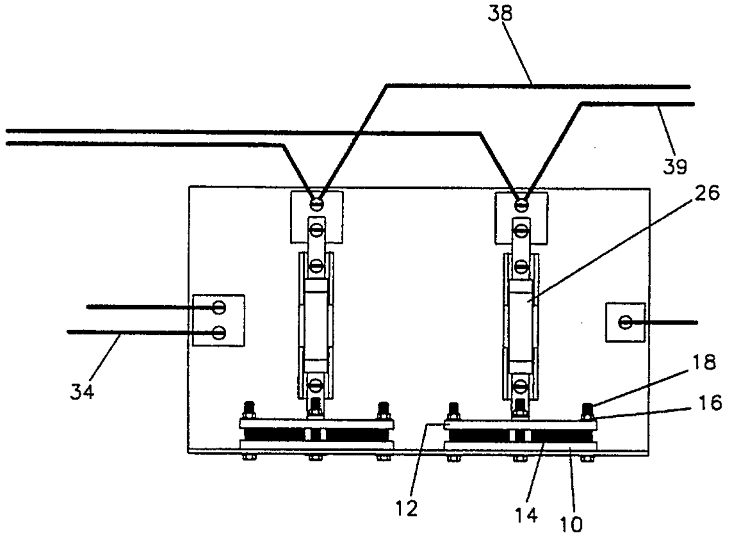
FIG. 5 is a side plan view of a two phase surge arrester useful with 120/240 volt single phase circuits.

FIG. 4 shows a side view of a one phase surge arrester useful with a single phase of any voltage up to 480 V RMS identical in construction to the arrester shown in FIG. 1. FIG. 5 shows a side view of a two phase surge arrester useful with 120/240 volt single phase current. The surge arrester shown in FIG. 4 protects a single phase 36, and the surge arrester shown in FIG. 5 protects split phase power 38, 39.

Figure 6:
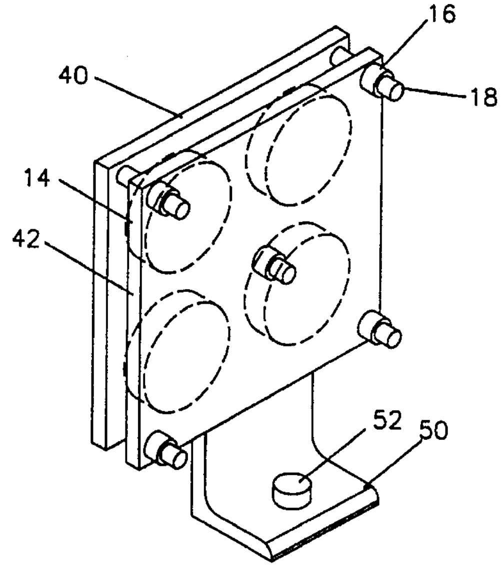
FIG. 6 is a side perspective view of a surge arrester for use with a single phase circuit.
Figure 8:
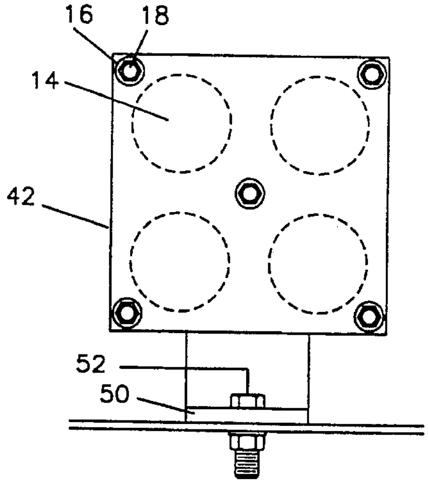
FIG. 8 is a front plan view of the surge arrester shown in FIG. 6.
Figure 9:
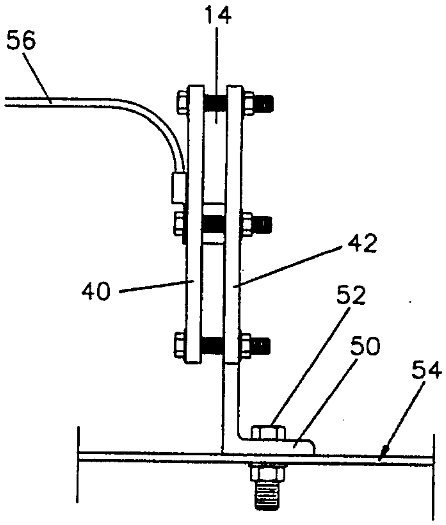
FIG. 9 is a side plan view of the surge arrester shown in FIGS. 6 and 8.

FIG. 6 shows a side perspective view of a surge arrester for use with a single phase. FIG. 8 shows a front view of the same embodiment of a surge arrester. FIG. 9 shows a side view of the surge arrester shown in FIG. 6. Between a first 40 and a second 42 contact plate are four MOVs 14 in parallel. The plates are connected and tensioned using non-conductive nylon nuts 16, bolts 18, and optionally washers (not shown). The first contact plate 40 is attached to a grounding base 50, which is connected to a grounding plate 54 with a grounding connection 52 comprising conductive nuts and bolts. The second contact plate 42 is connected to the power circuit by attachment wire 56.

Figure 7:
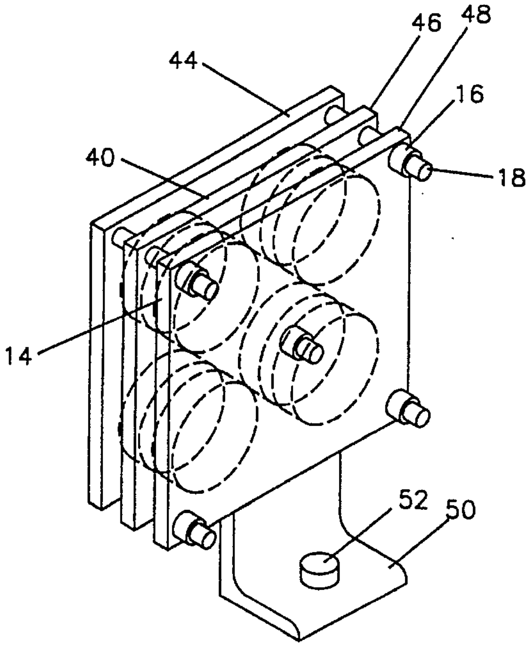
FIG. 7 is a side perspective view of an alternate embodiment of a single phase surge arrester with two sets of MOVs in parallel for use in circuits when higher currents are expected.

FIG. 7 shows a side perspective view of an alternate embodiment surge arrester with two serial levels. This embodiment is identical to the embodiment shown in FIG. 6, except that three contact plates 44, 46, 48 are used, sandwiching two layers of MOVs 14. This results in two sets of four parallel MOVs all in parallel, increasing the surge current that the surge arrester can handle. Obviously, more sets of MOVs can be utilized, using more parallel contact plates, to achieve higher surge current capacity.

Although the present invention has been described with reference to a preferred embodiments, numerous modifications and variations can be made and still the results will come within the spirit and scope of this invention. No limitation with respect to the specific embodiments disclosed herein is intended or should be inferred.

I claim:

1. A surge arrester comprising:

a pair of conductive plates having a parallel spatial relationship with a separation therebetween;

a plurality of MOVs supported between said plates in said separation, and having a conductive contact with each of said plates;

a power phase means connected to a first member of said pair; and a power ground means connected to a second member of said pair, whereby transients are shared in parallel by the MOVs.

2. A surge arrester as claimed in claim 1 wherein said pair of conductive plates are comprised of aluminum.

3. A surge arrester as claimed in claim 1 wherein said plurality of MOVs further comprises four MOVs arranged in a square.

4. A surge arrester as claimed in claim 3 further comprising non-conductive means for attaching said pair of conductive plates together, wherein said attachment means comprises non-conductive nut and bolt combinations, one of said nut and bolt combinations located in the center and one of said nut and bolt combinations located at each corner.

5. A surge arrester as claimed in claim 1 whereby the MOVs further comprise substantially equal clamping voltage during a transient, whereby transients are equally shared in parallel by said MOVs.

6. A surge arrester as claimed in claim 1 further comprising a third conductive plate, said third conductive plate having a parallel spatial relationship with said pair of conductive plates with a separation between said third conductive plate and one of said pair of conductive plates.

7. A surge arrester as claimed in claim 6 further comprising a second plurality of MOVs, said second plurality of MOVs being supported in the separation between said third conductive plate and one of said pair of conductive plates, and having a conductive contact with said third plate and said one of said pair of plates.

8. A surge suppresser as claimed in claim 5 whereby each of said plurality of MOVs include ZnO and are constructed using precursor powder that contains small particles of the additive metal oxides evenly distributed throughout the larger particles of the primary metal oxide.

9. A surge arrester as claimed in claim 1 which further comprises a mounting plate attached to one of said pair of conductive plates.

10. A surge arrester as claimed in claim 1 which additionally has a slow-blow fuse connected in series with said plurality of MOVs.

11. A surge arrester as claimed in claim 1 which additionally has a visual means of identifying a short circuit, said visual identification means being connected in parallel with said plurality of MOVs.

12. A surge arrester comprising:

a pair of conductive plates having a parallel spatial relationship with a separation therebetween;

non-conductive means for attaching said pair of conductive plates together;

a plurality of MOVs supported between said plates in said separation and having a conductive contact with each of said plates;

a power phase means connected to a first member of said pair; and a power ground means connected to a second member of said pair, whereby transients are shared in parallel by the MOVs.

13. A surge suppresser as claimed in claim 12 wherein said plurality of MOVs further comprises four MOVs arranged in a square.

14. A surge suppresser as claimed in claim 12 whereby said attachment means comprising the use of nonconductive nut and bolt combinations.

15. A surge suppresser as claimed in claim 12 whereby said pair of conductive plates are comprised of aluminum.

16. A surge suppresser as claimed in claim 12 whereby each of said plurality of MOVs are constructed using precursor powder that contains small particles of an additive metal oxides evenly distributed throughout the larger particles of a primary metal oxide.

17. A surge suppresser as claimed in claim 16 wherein said primary metal oxide comprises ZnO.

18. A surge suppresser as claimed in claim 12 wherein said plurality of MOVs consists of two sets of MOVs, each said set consisting of four MOVs arranged in a square.

19. A three phase surge arrester comprising:

three pair of conductive plates, wherein each of the members of each said pair has a parallel spatial relationship with the other member of the pair and a separation between the two members of the pair;

a plurality of MOVs supported between each said pair of plates in said separation between each said pair of plates, and having a conductive contact with each of said plates;

a separate power phase means connected to a first member of each said pair; and a power ground means connected to a second member of each said pair, whereby transients are shared in parallel by the MOVs.

20. The surge arrester of claim 19 wherein said power ground means further comprises a common backplate.

21. A three phase surge arrester comprising:

three pair of conductive plates, wherein each of the members of each said pair has a parallel spatial relationship with the other member of the pair and a separation between the two members of said pair has a parallel spatial relationship with the other member of the pair and a separation between the two members of the pair;

a plurality of MOVs supported between said pair of plates in said separation between each said pair of plates, and having a conductive contact with each of said plates;

a mounting means for a fuse for each of said three phases electrically connected to a first member of each said pair;

an indication means electrically connected between the first member and a second member of each said pair such that a no fault condition is indicated;

a separate power phase means connected to said mounting means for a fuse;

a mounting plate;

said second member of each pair having an electrical and a thermal connection to a first inside leg of stud mounting plate; and a power ground means electrically connected to said mounting plate and said second member of each said pair, whereby transients are shared in parallel by the MOVs.

* * * * *